United States Patent
Song et al.

(10) Patent No.: US 11,462,217 B2
(45) Date of Patent: Oct. 4, 2022

(54) ELECTRONIC APPARATUS AND CONTROL METHOD THEREOF

(71) Applicant: Samsung Electronics Co., Ltd., Suwon-si (KR)

(72) Inventors: Kihyun Song, Suwon-si (KR); Jongjin Park, Suwon-si (KR); Shina Kim, Suwon-si (KR); Sukhoon Yoon, Suwon-si (KR); Wonjae Lee, Suwon-si (KR); Jongkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 16/853,977

(22) Filed: Apr. 21, 2020

(65) Prior Publication Data

US 2020/0395014 A1   Dec. 17, 2020

(30) Foreign Application Priority Data

Jun. 11, 2019 (KR) .......................... 10-2019-0068939

(51) Int. Cl.
*G10L 15/22* (2006.01)
*G10L 25/21* (2013.01)

(52) U.S. Cl.
CPC .............. *G10L 15/22* (2013.01); *G10L 25/21* (2013.01); *G10L 2015/223* (2013.01)

(58) Field of Classification Search
USPC ................ 704/231, 246, 247, 251, 252, 275
See application file for complete search history.

(56) References Cited

U.S. PATENT DOCUMENTS

| 10,239,539 B2 | 3/2019 | Aoki et al. |
| 10,311,876 B2 | 6/2019 | Gruenstein et al. |
| (Continued) | | |

FOREIGN PATENT DOCUMENTS

| CN | 108847219 | 11/2018 |
| CN | 109256134 | 1/2019 |
| (Continued) | | |

OTHER PUBLICATIONS

International Search Report and Written Opinion dated Aug. 7, 2020 in corresponding International Application No. PCT/KR2020/005434.

*Primary Examiner* — Leonard St. Cyr
(74) *Attorney, Agent, or Firm* — Nixon & Vanderhye, P.C.

(57) ABSTRACT

An electronic apparatus is disclosed. The electronic apparatus includes: a microphone, an IC chip configured to, based on a level of a user voice received through the microphone being equal to or greater than a threshold value set as a first level, identify whether the user voice includes a wake-up-word (WUW), and a processor configured to, based on the WUW being included in the user voice, transmit a signal corresponding to the user voice to an external electronic apparatus, and based on the transmitting of the signal corresponding to the user voice being completed, set the threshold value as a second level lower than the first level, wherein the IC chip is configured to, based on a subsequent user voice being received through the microphone, identify whether a level of the subsequent user voice is equal to or greater than the threshold value set as the second level, and based on the level of the subsequent user voice being equal to or greater than the threshold value set as the second level, identify whether the subsequent user voice includes the WUW.

17 Claims, 11 Drawing Sheets

(56) References Cited

U.S. PATENT DOCUMENTS

| | | |
|---|---|---|
| 10,418,027 B2 | 9/2019 | Ko et al. |
| 10,579,327 B2 | 3/2020 | Kagoshima |
| 2006/0111901 A1 | 5/2006 | Woo |
| 2014/0241540 A1 | 8/2014 | Hodges et al. |
| 2014/0278395 A1* | 9/2014 | Zurek .................... G10L 15/20 704/231 |
| 2015/0081296 A1* | 3/2015 | Lee ........................ G10L 15/20 704/251 |
| 2015/0223110 A1* | 8/2015 | Lindner ............. H04L 65/4061 455/518 |
| 2016/0077794 A1 | 3/2016 | Kim et al. |
| 2017/0193996 A1* | 7/2017 | Zurek .................... G06F 3/013 |
| 2017/0256270 A1 | 9/2017 | Singaraju et al. |
| 2018/0233150 A1* | 8/2018 | Gruenstein ............. G10L 15/26 |
| 2018/0275951 A1 | 9/2018 | Kagoshima |
| 2019/0172455 A1 | 6/2019 | Park |
| 2021/0390948 A1* | 12/2021 | Shah .................... G10L 15/065 |

FOREIGN PATENT DOCUMENTS

| | | |
|---|---|---|
| EP | 3872619 | 1/2021 |
| JP | 6553111 | 7/2019 |
| KR | 10-2000-0059978 | 10/2000 |
| KR | 10-2018-0040426 | 4/2018 |
| KR | 10-1924963 | 12/2018 |
| KR | 10-2019-0016851 | 2/2019 |
| KR | 10-2020-0084727 | 7/2020 |

\* cited by examiner

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0068939, filed on Jun. 11, 2019, in the Korean Intellectual Property Office, the disclosure of which is incorporated by reference herein in its entirety.

BACKGROUND

1. Field

The disclosure relates to an electronic apparatus and a control method thereof. For example, the disclosure relates to an electronic apparatus capable of recognizing a user voice and a control method thereof.

2. Description of Related Art

Various electronic apparatuses have been developed recently due to the development of electronic technologies. In particular, voice recognition apparatuses such as a remote control, an AI (Artificial Intelligence) speaker, a smartphone, and a smart TV that recognize a user voice and operate according to the user voice have been developed.

It is common that the voice recognition device performs a recognition of a user voice, when the user voice of a predetermined size or more is received.

However, the conventional voice recognition apparatus recognizes the user voice even when the user voice of relatively low size is received in order to increase a recognition rate of the user voice.

However, this may result in unnecessary power consumption. For example, even when a daily conversation voice is received instead of the user voice for controlling the voice recognition apparatus, the conventional voice recognition apparatus performs recognition of the user voice.

SUMMARY

Embodiments of the disclosure provide an electronic apparatus capable of increasing a recognition rate of a user voice while preventing and/or reducing unnecessary power consumption.

According to an example embodiment of the disclosure, an electronic apparatus includes: a microphone, an IC chip configured to, based on a level of a user voice received through the microphone being equal to or greater than a threshold value set as a first level, identify whether the user voice includes a wake-up-word (WUW), and a processor configured to, based on the WUW being included in the user voice, transmit a signal corresponding to the user voice to an external electronic apparatus, and based on the transmitting of the signal corresponding to the user voice being completed, set the threshold value to a second level lower than the first level, wherein the IC chip is configured to, based on a subsequent user voice being received through the microphone, identify whether a level of the subsequent user voice is equal to or greater than the threshold value set as the second level, and based on the level of the subsequent user voice being equal to or greater than the threshold value set as the second level, identify whether the subsequent user voice includes the WUW.

According to an example embodiment of the disclosure, a control method of an electronic apparatus includes: identifying whether a level of a user voice received through a microphone is equal to or greater than a threshold value set as a first level, identifying whether the user voice includes a wake-up-word (WUW) based on the level of the user voice being equal to or greater than the threshold value set as the first level, transmitting a signal corresponding to the user voice to an external electronic apparatus based on the WUW being included in the user voice, and setting the threshold value to a second level lower than a first level based on a transmission of a signal corresponding to the user voice being completed, wherein the control method further includes based on a subsequent user voice being received through the microphone, identifying whether a level of the subsequent user voice is equal to or greater than the threshold value set as the second level; and based on the level of the subsequent user voice being identified to be equal to or greater than the threshold value set as the second level, identifying whether the subsequent user voice includes the WUW.

According to an example embodiment of the disclosure, an electronic apparatus includes: a microphone, an IC chip configured to, based on a level of a user voice received through the microphone being equal to or greater than a threshold value set as a first level, identify whether the user voice includes a wake-up-word (WUW) and a processor configured to, based on the WUW being included in the user voice, perform an operation corresponding to the user voice, and set the threshold value as a second level lower than the first level, wherein the IC chip is configured to, based on a subsequent user voice being received through the microphone, identify whether a level of the subsequent user voice is equal to or greater than the threshold value set as the second level, and based on the level of the subsequent user voice being equal to or greater than the threshold value set as the second level, identify whether the subsequent user voice includes the WUW.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms used in the present disclosure and the claims are general terms selected in consideration of the functions of the various example embodiments of the present disclosure. However, such terms may be varied depending on an intention of those skilled in the art, a legal or technical interpretation, an emergence of a new technology, and the like. Also, there may be some arbitrarily selected terms. Such terms may be construed according to descriptions in the present disclosure, and may also be construed based on general contents of the present disclosure and a typical technical concept in the art unless the terms are not specifically defined.

In describing example embodiments, detailed description of relevant known functions or components may be omitted if it would obscure the description of the subject matter.

Furthermore, embodiments of the disclosure will be described in detail with reference to the accompanying drawings and the contents described in the accompanying drawings, but the disclosure is not limited or limited by the embodiments.

Hereinafter, various example embodiments will now be explained in greater detail with reference to the accompanying drawings.

Figure 1:
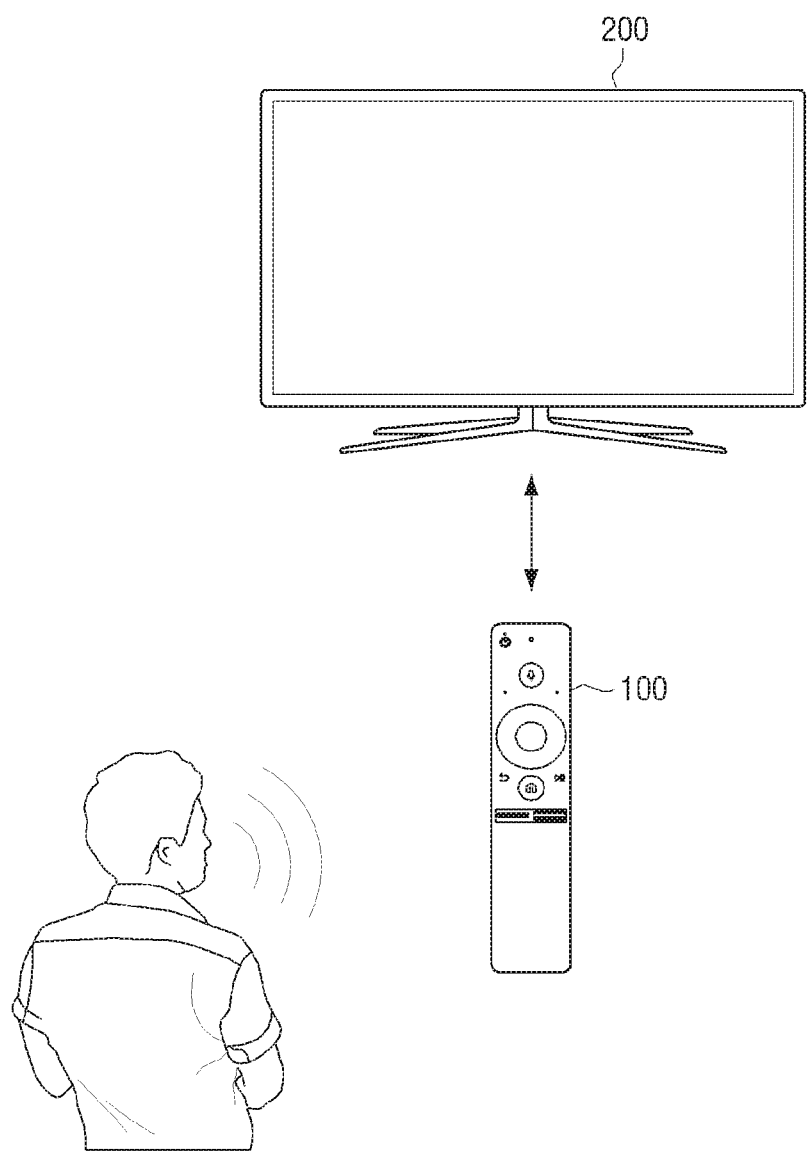
FIG. 1 is a diagram illustrating an example electronic system according to an embodiment of the disclosure.

FIG. 1 is a diagram illustrating an example electronic system according to an embodiment of the disclosure.

Referring to FIG. 1, the electronic system 10 according to an embodiment of the disclosure includes an electronic apparatus 100 and an external electronic apparatus 200.

The electronic apparatus 100 may, for example, be an apparatus capable of controlling the external electronic apparatus 200, and may be implemented, for example, as a remote controller, as illustrated in FIG. 1. However, this is only an example, and the disclosure is not so limited. For example, the electronic apparatus 100 may include an electronic apparatus such as, for example, and without limitation, a smartphone, a tablet PC, a laptop, or the like, and may include a wearable device such as a smart watch, or the like.

In addition, the external electronic apparatus 200 may, for example, be an electronic apparatus to be controlled by the electronic apparatus 100, and as illustrated in FIG. 1, may, for example, be a smart TV 200. However, this is only an example, and the external electronic apparatus 200 is not so limited and may include various electronic apparatus such as, for example, and without limitation, a TV, an air conditioner, a washing machine, a refrigerator, an air cleaner, a robot cleaner, a humidifier, a door lock, a dishwasher, a security camera, a closed circuit television (CCTV), a security sensor, a light emitting diode (LED), lamps, heaters, a power meter, a power socket, an electrical outlet, multi-taps, a personal computers (PC), IP cameras, or the like.

The electronic apparatus 100 may control the external electronic apparatus 200.

For example, the electronic apparatus 100 may establish a communication link with the external electronic apparatus 200 through a communication method such as, for example, and without limitation, Wi-Fi, ZigBee, Z-Wave, Bluetooth, or the like, and transmit a control signal to the external electronic apparatus 200 through wireless communication to control the external electronic apparatus 200.

The control signal may be a signal corresponding to the user voice. For example, when the user voice is received through a microphone of the electronic apparatus 100, the electronic apparatus 100 may identify whether the user voice includes a wake-up-word (WUW). When it is determined that the user voice includes a wake-up-word, the electronic apparatus 100 may transmit a signal corresponding to the user voice to the external electronic apparatus 200. Accordingly, the external electronic apparatus 200 may perform a function corresponding to the user voice.

The electronic apparatus 100 may transmit, for example, an IR signal for controlling the external electronic apparatus 200 to the external electronic apparatus 200. For this operation, the electronic apparatus 100 may include an IR receiver.

Hereinafter, the electronic apparatus 100 of the disclosure will be described in greater detail with reference to FIG. 2.

Figure 2:
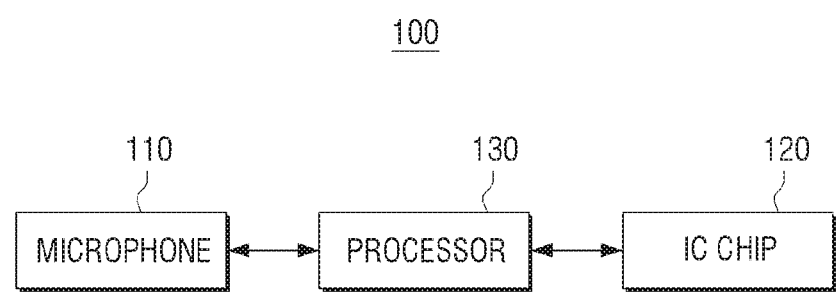
FIG. 2 is a block diagram illustrating an example electronic apparatus according to an embodiment of the disclosure.

FIG. 2 is a block diagram illustrating an example electronic apparatus according to an embodiment of the disclosure.

Referring to FIG. 2, the electronic apparatus 100 includes a microphone 110, an IC chip 120, and a processor (e.g., including processing circuitry) 130.

The microphone 110 may receive a user voice. The user voice may be a voice for controlling the external electronic apparatus 200, and may be various voices that occur around the electronic apparatus 100.

The IC chip 120 may measure a level of the user voice received through the microphone 110. For example, when the user voice is received through the microphone 110 of the IC chip 120, a size (e.g., level) of the user voice may be measured based on an amplitude of the user voice.

However, this is only an example, and the IC chip 120 may measure the size of the user voice through various methods. As an example embodiment, the IC chip 120 may measure the size of the user voice based on a sensing value of a sensor that outputs a voltage having a size corresponding to the size of the user voice. For this operation, the IC chip 120 may include a sound detection sensor.

When the size of the user voice received through the microphone 110 is greater than or equal to a predetermined threshold value, the IC chip 120 may identify whether the user voice includes a wake-up-word (WUW).

For example, if the size of the user voice received through the microphone 110 is greater than or equal to the predetermined threshold value, the IC chip 120 may convert the user voice, which is an analog signal, into a digital signal. For this operation, the IC chip 120 may use an analog/digital converter (not illustrated). In addition, the IC chip 120 may apply a speech to text (STT) algorithm to the user voice converted into the digital signal, convert the user voice into text, and identify whether the text includes a wake-up-word.

For example, if the wake-up-word is 'Hi, Bixby', the IC chip 120 may identify whether 'Hi, Bixby' is included in the text.

Thereafter, when it is determined that the user voice includes the wake-up-word, the IC chip 120 may transmit a wake-up signal to the processor 130.

The processor 130 may include various processing circuitry and control the overall operation of the electronic apparatus 100. The processor 130 may include, for example, and without limitation, one or more of a dedicated processor, a central processing unit (CPU), application processor (AP), a communication processor (CP), or the like.

The processor 130 may transmit the wake-up signal received from the IC chip 120 to the external electronic apparatus 200.

For example, when the wake-up signal is received from the IC chip 120, the processor 130 may transmit the wake-up signal to the external electronic apparatus 200 through wireless communication. As an example, the processor 130 may the wake-up signal to the external electronic apparatus 200 through a Bluetooth communication method. For this operation, the processor 130 may include a Wi-Fi chip, a Bluetooth chip, a wireless communication chip, or the like.

The wake-up signal may be a signal for activating a voice recognition function of the external electronic apparatus 200. When the wake-up signal is received, the external electronic apparatus 200 may activate the voice recognition function and request the electronic apparatus 100 to transmit the voice signal.

When the signal requesting the transmission of the voice signal is received from the external electronic apparatus 200 in response to the transmission of the wake-up signal, the processor 130 may request the IC chip 120 to transmit a signal corresponding to the user voice.

In this example, the IC chip 120 may transmit a signal corresponding to the user voice to the processor 130. For this operation, the IC chip 120 may, for example, store information about the user voice received through the microphone 110 in a buffer. For example, when the user voice is received through the microphone 110, the IC chip 120 may store information about the user voice in the buffer, and when a signal that requests a transmission of the signal corresponding to the user voice from the processor 130, the IC chip 120 may transmit the signal corresponding to the user voice to the processor 130 based on the information on the user voice stored in the buffer.

When the signal corresponding to the user voice is received from the IC chip 120, the processor 130 may transmit the signal corresponding to the user voice to the external electronic apparatus 200 through wireless communication.

Accordingly, the external electronic apparatus 200 may perform a function corresponding to the user voice.

For example, when the signal corresponding to the user voice is received, the external electronic apparatus 200 may apply a speech to text (STT) algorithm to the user voice, convert the user voice into text, and perform a function corresponding to the user voice based on speech elements included in the text.

For example, if the user voice received through the microphone 110 is 'Hi, Bixby, turn on the TV', the external electronic apparatus 200 may turn on the power.

As described above, after the transmission of the wake-up signal, when a signal for requesting the transmission of a voice signal is received from the external electronic apparatus 200, the signal corresponding to the user voice is transmitted to the external electronic apparatus 200, but this is only an example. When it is determined that the wake-up-word is included in the user voice, the IC chip 120 may transmit a signal corresponding to the user voice to the processor 130, and when the signal corresponding to the user voice is received, the processor 130 may transmit it to the external electronic apparatus 300 through wireless communication.

In addition, although the IC chip 120 and the processor 130 are described as separate components, it is only an example, and the processor 130 may perform a function performed by the IC chip 120 described above. In other words, when the user voice is received through the microphone 110, the processor 130 may identify whether the size of the user voice is equal to or greater than a predetermined threshold value, and identify whether the user voice includes a wake-up-word.

The processor 130 may change the above-described predetermined threshold value to a relatively low threshold value based on a completion of transmission of the signal corresponding to the user voice. For example, the processor 130 may set the threshold value set as a first level to a second level lower than the first level.

For example, after transmitting the signal corresponding to the user voice to the external electronic apparatus 200, the processor 130, when a signal requesting to stop the transmission of the voice signal is received from the external electronic apparatus 200, the processor 130 may identify that the transmission of the signal corresponding to the user voice is completed, and may change the predetermined threshold value to a relatively low threshold value.

It is considered that when the user utters a user voice including a wake-up-word, there is a high possibility of uttering a subsequent user voice including the wake-up-word. As an example, the user is likely to utter a user voice such as 'Hi, Bixby, turn on the TV', and then utter a user voice such as 'Hi, Bixby, turn up the level'. Accordingly, it is necessary to determine whether the wake-up-word is included in the subsequent user voice even when a small size of the subsequent user voice is received by changing the threshold value to a low threshold value.

In other words, when the subsequent user voice is received through the microphone 110, the IC chip 120 may identify whether the size of the subsequent user voice is greater than or equal to a threshold value set as the second level, and the size of the subsequent user voice is greater than or equal to the threshold value set as the second level, the IC chip 120 may identify whether a wake-up-word is included in the subsequent user voice.

As described above, the example embodiment performs the identification of whether the user voice includes a wake-up-word, when a user voice above the threshold value set to the first level relatively higher than the second level is received. Accordingly, when a user voice below the threshold value set as the first level, such as a daily conversation voice, or the like, is received, it is not identified whether the user voice includes a wake-up-word, thereby avoiding unnecessary power consumption and unnecessary operation of the IC chip.

In addition, the determination of whether the user voice includes a wake-up-word in a subsequent user voice is performed when a user voice having the threshold value set to the second level relatively lower than the first level is received. Accordingly, the disclosure may increase a recognition rate of the wake-up-word included in the subsequent user voice even through a small number of microphones.

Figure 3:
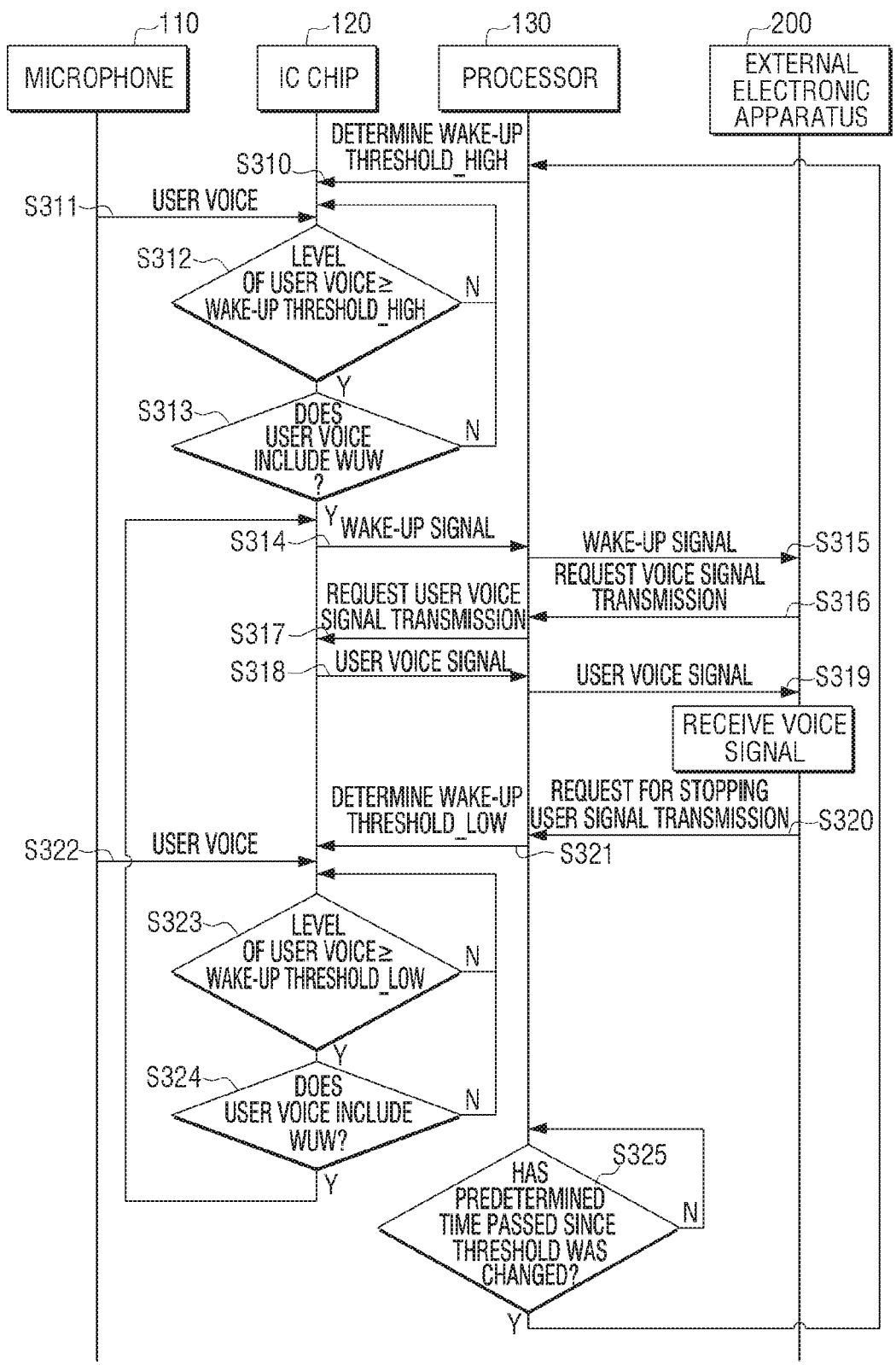
FIG. 3 is an operational flow diagram illustrating an example control method of an electronic apparatus according to an embodiment of the disclosure.

FIG. 3 is an operational flow diagram illustrating an example control method of an electronic apparatus according to an embodiment of the disclosure.

Hereinafter, for convenience of description, a state in which the IC chip 120 can identify the size of the user voice received through the microphone 110 is referred to as a first state (or sleep state), and a state in which the IC chip 120 can identify whether a wake-up-word is included is referred to as a second state (or an active state).

The processor 130 may determine and set a wake-up threshold value to a first level (S310). The wake-up threshold value may be set at the factory level, as well as various sizes according to a user command, and the first level may be a relatively high as described above.

The IC chip 120 may identify whether the size of the user voice is equal to or greater than a threshold value set as the first level when the user voice is received (S311) while operating in the first state (S312). As an example, the level of the user voice may be measured based on the amplitude of the user voice of the IC chip 120.

The IC chip 120 may maintain the first state when the level of the user voice is less than the threshold value set as the first level, and the IC chip 120 may operate in the second state for identifying whether the wake-up-word is included in the user voice when the level of the user voice is greater than or equal to the threshold value set as the first level.

As described above, since the disclosure first determines whether to convert to the second state based on the threshold value set to a relatively high first level, when a small level of voice is received through the microphone 110, it may not be converted to the second state. Accordingly, unnecessary power consumption and computational burden of the IC chip 120 may be prevented.

In the second state, the IC chip 120 may identify whether a wake-up-word is included in the user voice (S313). For example, the IC chip 120 may apply a speech to text (STT) algorithm to the user voice, convert the user voice to text, and identify whether the text includes a wake-up-word.

For example, if the wake-up-word is 'Hi, Bixby', the IC chip 120 may identify whether 'Hi, Bixby' is included in the text.

When it is determined that the user voice includes a wake-up-word, the IC chip 120 may generate a wake-up signal, transmit it to the processor 130 (S314), and then convert to the first state. If it is determined that the user voice does not include a wake-up-word, the IC chip 120 may convert to the first state without transmitting the wake-up signal.

When the wake-up signal is received from the IC chip 120, the processor 130 may transit the wake-up signal to the external electronic apparatus 200 (S315), and receive a response signal with respect to the wake-up signal from the external electronic apparatus 200 (S316). The response signal may be a signal requesting transmission of a voice signal.

When the response signal is received from the external electronic apparatus 200, the processor 130 may request the IC chip 120 to transmit a signal corresponding to the user voice (S317).

In this example, the IC chip 120 may transmit the signal corresponding to the user voice to the processor 130 (S318) based on information about the user voice stored in the buffer.

When the signal corresponding to the user voice is received from the IC chip 120, the processor 130 may transmit the signal corresponding to the user voice to the external electronic apparatus 200 (S319).

When the receiving of the signal corresponding to the user voice is completed, the external electronic apparatus 200 may request the processor 130 to stop transmitting the voice signal (S320).

In this example, the processor 130 may set the threshold value set as the first level to a second level lower than the first level (S321).

Thereafter, while operating in the first state, when a subsequent user voice is received (S322), the IC chip 120 identifies whether the level of the subsequent user voice is greater than or equal to the threshold value set as the second level (S323), and if the level is less than the threshold value set as the second level, the IC chip may maintain the first state. If the level of the subsequent user voice is greater than or equal to the threshold value set as the second level, the IC chip 120 may operate in the second state for identifying whether the subsequent user voice includes a wake-up-word.

In the second state, the IC chip 120 may identify whether the wake-up-word is included in the subsequent user voice (S324), and when it is determined that the wake-up-word is included in the subsequent user voice, the IC chip 120 may generate a wake-up signal to transmit it to the processor 120. When it is determined that the wake-up-word is not included in the subsequent user voice, the processor 130 may convert to the first state.

As described above, the determination of whether a wake-up-word is included in a subsequent user voice is performed when the user voice having a threshold value set as the second level relatively lower than the first level is received. Accordingly, the disclosure may increase a recognition rate of the wake-up-word included in the subsequent user voice even through a small number of microphones.

If the wake-up signal within a predetermined time is not received from the IC chip 120 after changing the threshold value, the processor 130 may reset the threshold value set as the second level to the first level (S325). In other words, the processor 130 may reset the threshold value set as the second level to the first level when a user voice including a wake-up-word is not received through the microphone 110 within the predetermined time after changing the threshold value. The predetermined time may be 60 seconds, but this is only an example, and the predetermined time may be variously set or changed according to a user command.

It is considered that if the wake-up signal is not received within the predetermined time after changing the threshold value, then the user is less likely to utter a voice to control the external electronic apparatus 200.

Figure 4:
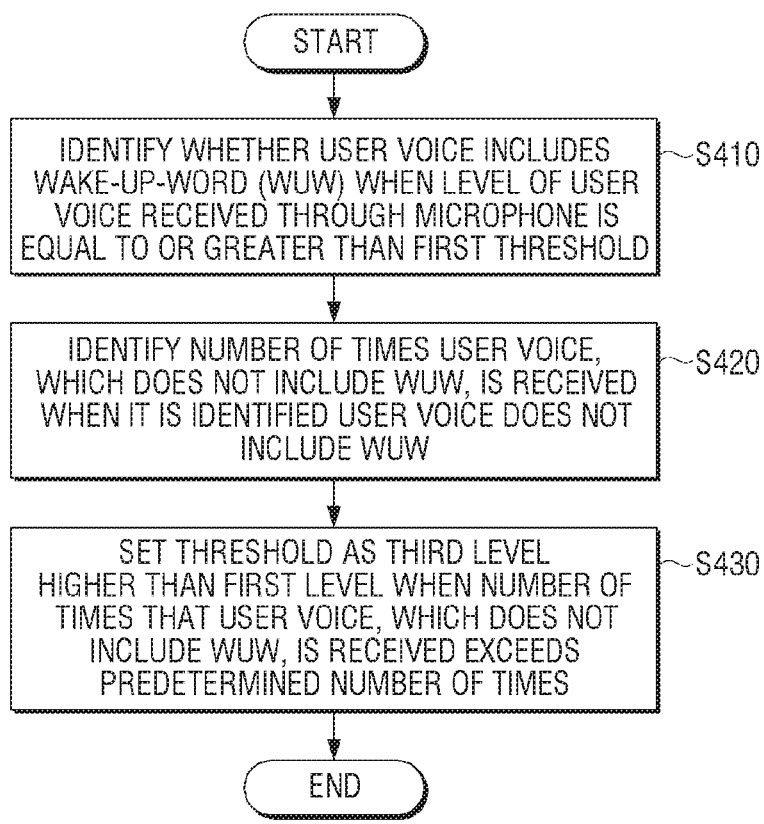
FIG. 4 is a flowchart illustrating an example operation performed when an electronic apparatus receives a user voice that does not include a wake-up-word, according to an embodiment of the disclosure.

FIG. 4 is a flowchart illustrating an example operation performed when an electronic apparatus receives a user voice that does not include a wake-up-word, according to an embodiment of the disclosure.

The IC chip 120 may measure the level of the user voice received through the microphone 110. If the size of the user voice is greater than or equal to a predetermined threshold value, the IC chip 120 may determine whether the wake-up-word is included in the user voice (S410).

If it is determined that the wake-up-word is not included in the user voice, the IC chip 120 may determine the number of times the user voice that does not include the wake-up-word is received (S420).

For this operation, when the user voice that does not include the wake-up-word is received, the IC chip 120 may store information on the number of times the user voice that does not include the wake-up-word is received in the memory. For example, when it is determined the user voice that that does not include the wake-up-word is received while the user voice that does not include the wake-up-word is received four times based on information on the number of times stored in the memory, the IC chip 120 may identify that the number of times the user voice which does not include the wake-up-word is received may be five times.

In addition, when it is determined that the number of times the user voice that does not include a wake-up-word is received exceeds the predetermined number of times, the IC chip 120 may transmit a signal requesting a change of the threshold value set as the first level to the processor 130. The predetermined number of times may be four times, but this is only an example, and the predetermined number of times may be variously set or changed according to a user command.

When the signal requesting to change the threshold value set as the first level is received from the IC chip 120, the processor 130 may set the threshold value to a third level higher than the first level (S430).

If this is a case when the user voice that does not include the wake-up-word is received several times, there may be a lot of noise around the electronic apparatus 100, and the threshold value is set relatively high to prevent and/or reduce unnecessary power consumption of the electronic apparatus and to prevent and/or reduce unnecessary operation of the IC chip.

When it is determined that the predetermined time has passed from the time when the threshold value is changed, the processor 130 may reset the threshold value set as the third level to the first level. The predetermined time may be 60 minutes, but this is only an example, and the predetermined time may be variously set or changed according to a user command.

It may be determined to be a case where the noise around the electronic apparatus 100 is temporarily increased.

The processor 130 may determine the threshold value as a different level according to the level of the user voice. This will be described in greater detail below with reference to FIG. 5.

Figure 5:
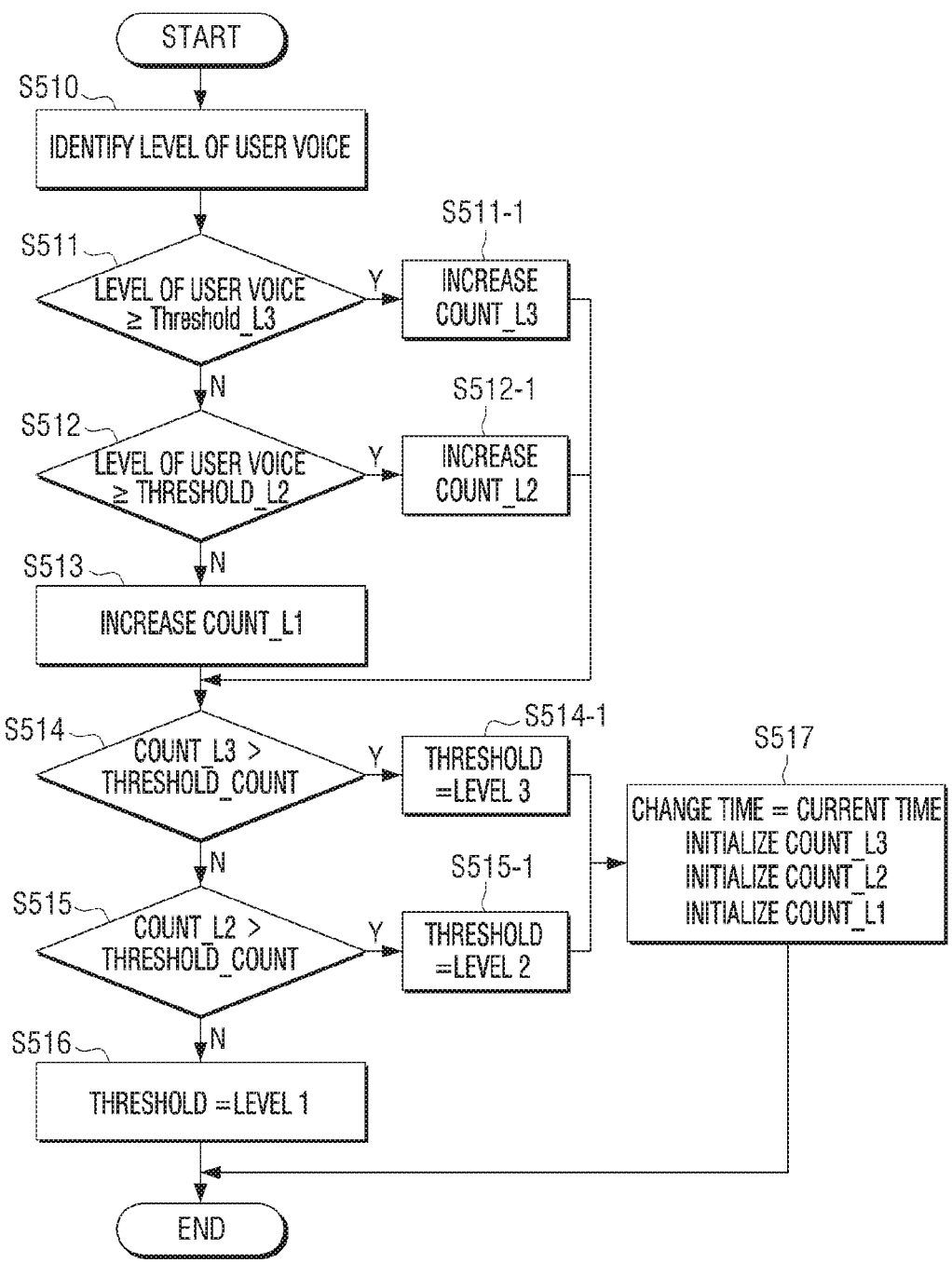
FIG. 5 is a flowchart illustrating an example in which an electronic apparatus sets different threshold values for each user voice level, according to an embodiment of the disclosure.

FIG. 5 is a flowchart illustrating an example in which an electronic apparatus sets different threshold values for each user voice level, according to an embodiment of the disclosure.

The electronic apparatus 100 according to an embodiment of the disclosure may determine a threshold value as one of the first, second, and third levels, and the first level is lower than the second level, and the second level is lower than the third level. However, this is an example, and the technical idea of the disclosure will not be limited thereto.

The IC chip 120 may determine the level of the user voice received through the microphone 110 (S510). IF the level of the user voice is greater than or equal to the threshold value set as the first level, the IC chip 120 may identify whether the user voice includes a wake-up-word.

When the wake-up-word is determined not to be included in the user voice, the IC chip 120 may identify whether the level of the user voice is greater than or equal to the third level (S511). When the size of the user voice is determined to be greater than or equal to the third level, the IC chip 120 may increase Count_L3 (S511-1). For example, if Count_L3 is 0 and the user voice is determined to be greater than or equal to the third level, Count_L3 may be increased to 1.

When the level of the user voice is determined to be less than the third level, the IC chip 120 may identify whether the level of the user voice is greater than or equal to the second level (S512). When the level of the user voice is determined to be greater than or equal to the second level (S512-1), the IC chip 120 may increase Count_L2 and when the level of the user voice is determined to be less than the second level, the chip 120 may increase the Count_L1 (S513).

The IC chip 120 may identify whether the number of times the user voice that does not include the wake-up-word is received exceeds the predetermined number of times.

For example, the IC chip 120 may identify whether the number of Count_L3 exceeds the predetermined number of times (S514). The IC chip 120 may request the processor 130 to change the threshold value set as the first level to the third level when the number of Count_L3 exceeds the predetermined number of times.

The processor 130 may change the threshold value to correspond to the threshold value requested by the IC chip 120. In other words, the threshold value set as the first level may change to the third level (S514-1).

If the number of Count_L3 is identified to be less than or equal to the predetermined number, the IC chip 120 may identify whether the number of Count_L2 exceeds the predetermined number (S515). The IC chip 120 may request the processor 130 to change the threshold value set as the first level to the second level when the number of Count_L2 exceeds the predetermined number.

In this case, the processor 130 may change the threshold value set as the first level to the second level (S515-1).

If the number of Count_L2 is identified to be equal to or less than the predetermined number, the IC chip 120 may maintain the threshold value as the first level (S516).

When the threshold value is changed by the processor 130, Count_L1, Count_L2, and Count_L3 may be initialized to 0 (S517).

As described above, the disclosure may prevent and/or reduce power consumption of the electronic apparatus 100 and increase a recognition rate of the wake-up-word by determining different threshold values according to the degree of noise around the electronic apparatus 100.

As described above, when it is identified that the predetermined time has passed from the time when the threshold value is changed, the processor may reset the threshold value set as the second level or the third level to the first level.

Figure 6A:
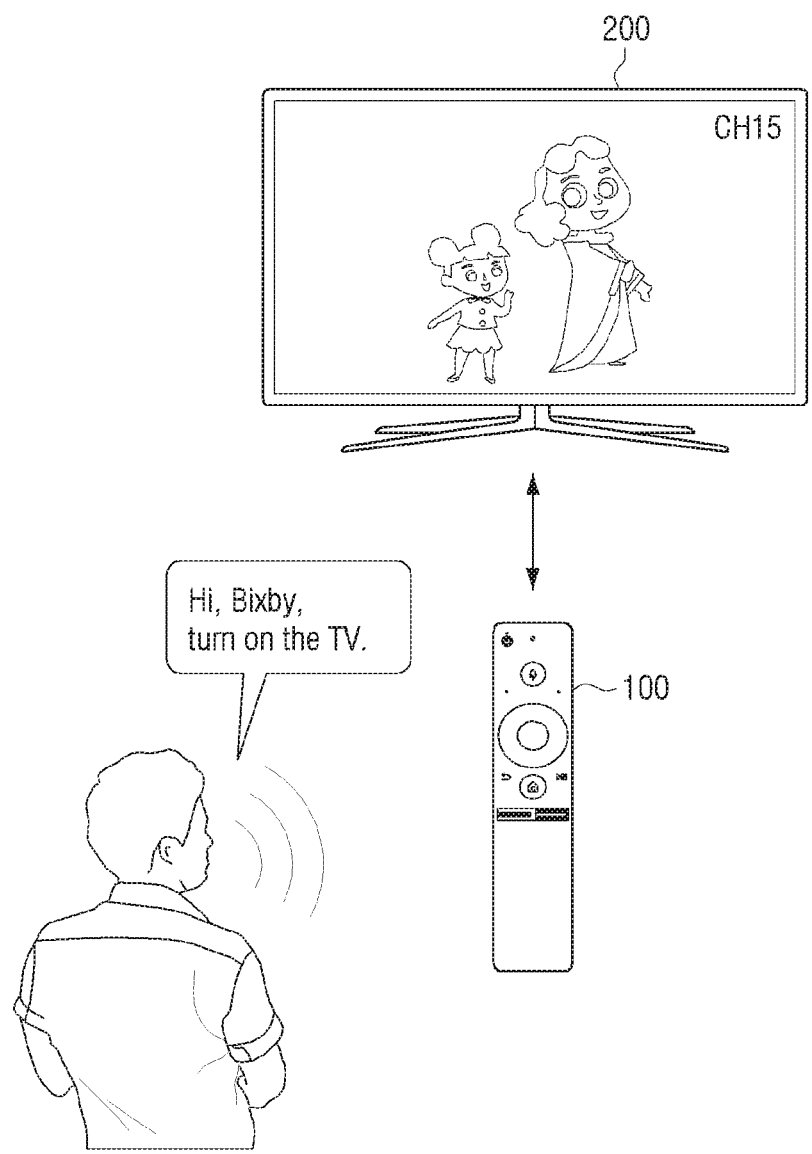
FIG. 6A is a diagram illustrating an example in which an electronic apparatus controls an external electronic apparatus based on a user voice, according to an embodiment of the disclosure.
Figure 6B:
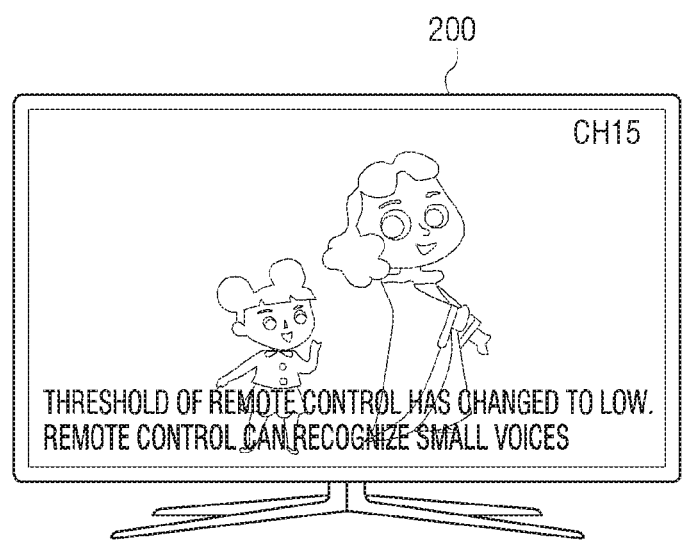
FIG. 6B is a diagram illustrating an example in which an electronic apparatus displays information about a threshold value through an external electronic apparatus, according to an embodiment of the disclosure.

FIG. 6A is a diagram illustrating an example in which an electronic apparatus controls an external electronic apparatus based on a user voice, according to an embodiment of the disclosure, and FIG. 6B is a diagram illustrating an example in which an electronic apparatus displays information about a threshold value through an external electronic apparatus, according to an embodiment of the disclosure.

Referring to FIG. 6A, the user may utter a user voice such as 'Hi, Bixby, turn on the TV'. In this example, if the user voice is identified to be equal to or greater than the threshold value set as the first level, the electronic apparats 100 may identify whether the wake-up-word 'Hi, Bixby' is included in the user voice.

When the user voice is identified to include the wake-up-word, the electronic apparatus 100 may transmit a wake-up signal to the external electronic apparatus 200, and when a signal requesting transmission of the voice signal is received from the external electronic apparatus 200 in response to the transmission of the wake-up signal, the electronic apparatus 100 may transmit a signal corresponding to the user voice to the external electronic apparatus 200.

For example, the external electronic apparatus 200 may perform functions corresponding to the user voice. For example, as illustrated in FIG. 6A, the external electronic apparatus 200 may turn on power according to the user voice.

The electronic apparatus 100 may determine the threshold value set as the first level to the second level.

The electronic apparatus 100 may transmit information that relates to the threshold value set in the electronic apparatus 100 to the external electronic apparatus 100. For example, when the threshold value is set as the first level, the electronic apparatus 100 may transmit information about the first level to the external electronic apparatus 200, and when the threshold value is set as the second level, information about the second level may be transmitted to the external electronic apparatus 200.

The external electronic apparatus 200 may display information about the threshold value set in the electronic apparatus 100.

For example, referring to FIG. 6B, the external electronic apparatus 200 may display information such as "Threshold of remote control has changed to low. The remote control can recognize small voices".

Accordingly, the user may visually check the threshold value set in the electronic apparatus 100, and may efficiently control the external electronic apparatus 200.

Figure 7A:
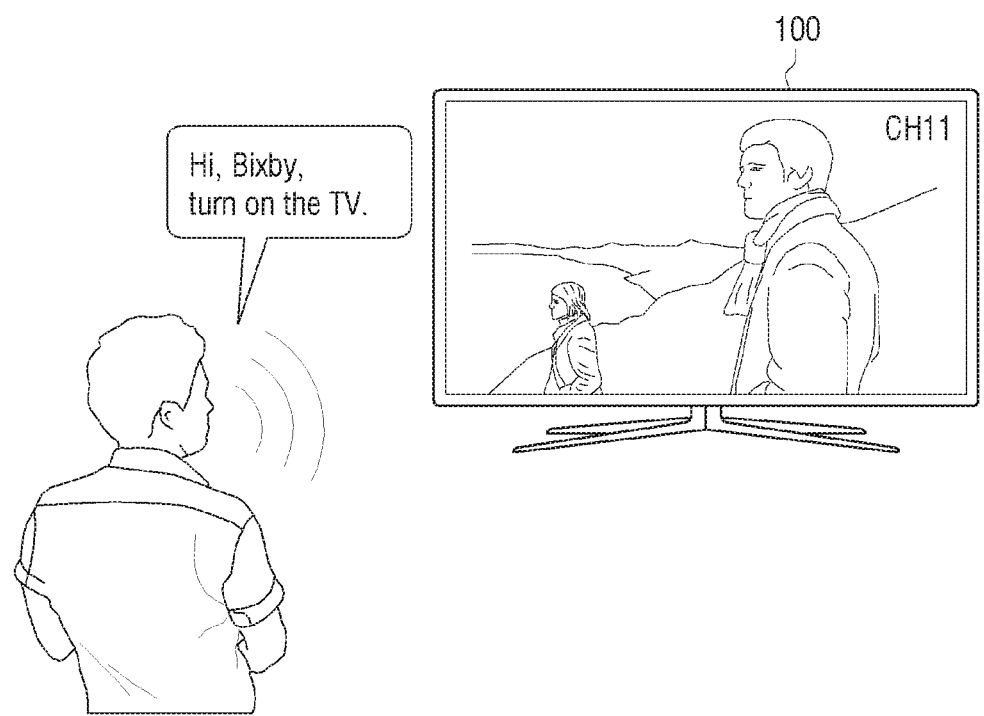
FIG. 7A is a diagram illustrating an example in which an electronic apparatus is operated based on a user voice, according to an embodiment of the disclosure.
Figure 7B:
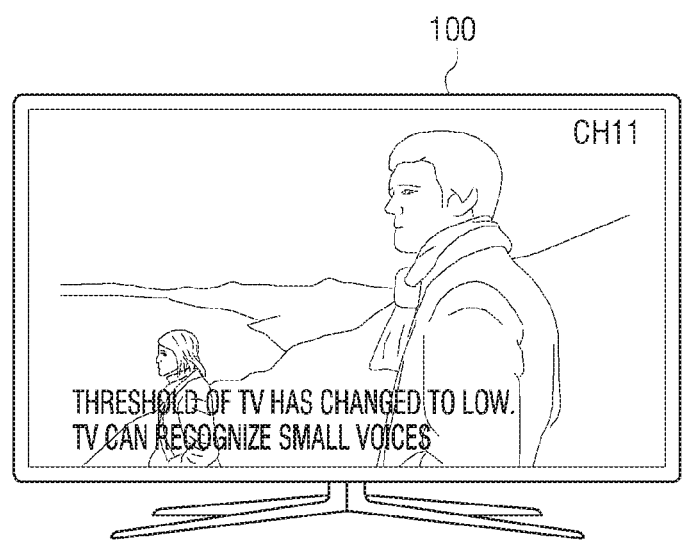
FIG. 7B is a diagram illustrating an example in which an electronic apparatus displays information about a threshold value according to an embodiment of the disclosure.

FIG. 7A is a diagram illustrating an example in which an electronic apparatus is operated based on a user voice, according to an embodiment of the disclosure, and FIG. 7B is a diagram illustrating an example in which an electronic apparatus displays information about a threshold value according to an embodiment of the disclosure.

It has been described that the electronic apparatus 100 according to an embodiment of the disclosure controls the external electronic apparatus 200 according to the user voice. However, this is only an example, and when the user voice is received, the electronic apparatus 100 may control the electronic apparatus 100 itself according to the user voice.

For example, the electronic apparatus 100 may be implemented as an AI speaker, a smartphone, a smart TV, or the like. In this case, a technical idea similar to the above-described technical idea may be applied.

For example, when the user voice is received through the microphone 110, the IC chip 120 of the electronic apparatus 100 may identify whether the level of the user voice is greater than or equal to a threshold value set as the first level. If the level of the user voice is greater than or equal to the threshold value set as the first level, the IC chip 120 may identify whether the user voice includes a wake-up-word.

For example, referring to FIG. 7A, the user may utter a user voice such as 'Hi, Bixby, turn on the TV'. In this example, when the user voice is identified to be equal to or greater than the threshold value set as the first level, the IC chip 120 may identify whether the wake-up-word 'Hi, Bixby' is included in the user voice.

In addition, when the wake-up-word is identified to be included in the user voice, the IC chip 120 may transmit a signal corresponding to the user voice to the processor 130.

When a signal corresponding to the user voice is received, the processor 130 may perform analysis of the user voice. For example, the processor 130 may convert a user voice into text by applying a speech to text (STT) algorithm to the user voice. In addition, the processor 130 may recognize an utterance factor included in the text and perform a function corresponding to the user voice based on the utterance factor.

For example, as illustrated in FIG. 7A, when the user voice such as 'Hi, Bixby, turn on the TV' is received, the processor 130 may turn on the power of the electronic apparatus 100 according to the user voice.

The processor 130 may determine the threshold value set as the first level to the second level.

Accordingly, when the subsequent user voice is received through the microphone 110, the IC chip 120 may identify whether the level of the subsequent user voice is greater than or equal to the threshold value set as the second level, and when the level of the subsequent user voice is greater than or equal to the threshold value set as the second level, the IC chip 120 may identify whether the wake-up-word is included in the subsequent user voice.

The IC chip 120 and the processor 130 have been described as separate configurations, but this is only an example, and the processor 130 may perform a function performed by the above-described IC chip 120. In other words, when the user voice is received through the microphone 110, the processor 130 may identify whether the level of the user voice is equal to or greater than the threshold value set as the first level, and identify whether the user voice includes a wake-up-word. The threshold value set as the first level may then be set as the second level, and when the subsequent user voice is received through the microphone 110, the processor 130 may identify whether the level of the subsequent user voice is greater than or equal to the threshold value set as the second level, and when the level of the subsequent user voice is greater than or equal to the threshold value set as the second level, the processor 130 may identify whether the subsequent user voice includes the wake-up-word.

The electronic apparatus 100 may display information about the threshold value set in the electronic apparatus 100. To do so, the electronic apparatus 100 may include a display.

For example, when the threshold value is set as the first level, the electronic apparatus 100 may display information about the first level, and when the threshold value is set as the second level, the electronic apparatus 100 may display information about the second level.

For example, referring to FIG. 7B, the electronic apparatus 100 may display information such as "Threshold of TV has changed to low. The TV can recognize small voices".

Accordingly, the user may visually check the threshold value set in the electronic apparatus 100, and may efficiently control the electronic apparatus 200.

Figure 8:
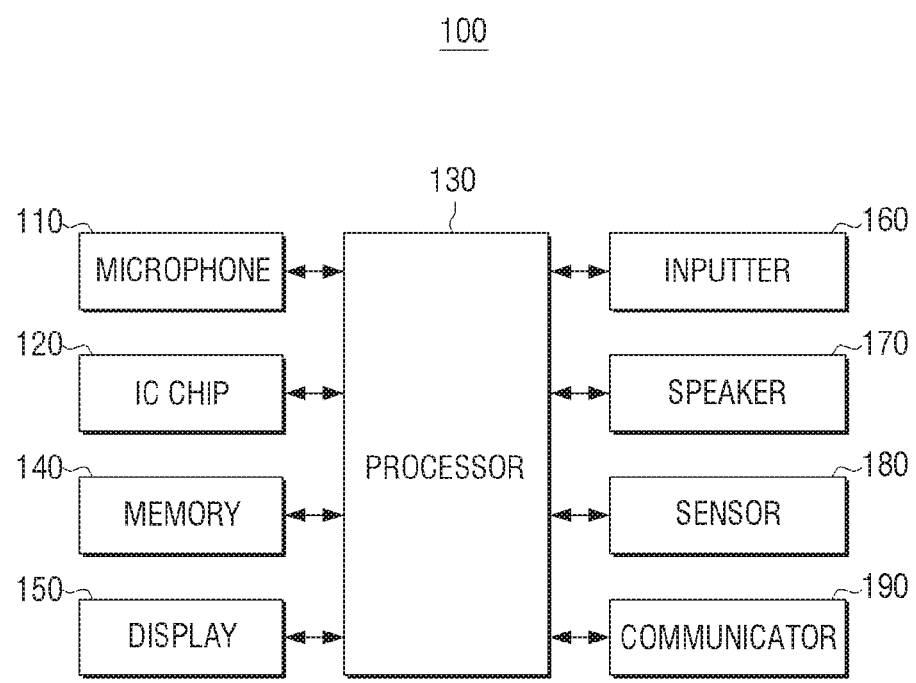
FIG. 8 is a block diagram illustrating an example configuration of an electronic apparatus according to an embodiment of the disclosure.

FIG. 8 is a block diagram illustrating an example configuration of an example electronic apparatus according to an embodiment of the disclosure.

Referring to FIG. 8, the electronic apparatus 100 may include a microphone 110, an IC chip 120, a memory 140, a display 150, an inputter (e.g., including input circuitry) 160, a speaker 170, a sensor 180, a communicator (e.g., including communication circuitry) 190, and a processor (e.g., including processing circuitry) 130. Hereinafter, parts overlapping with the above description may not be repeated here.

The memory 140 may store an operating system (OS) for controlling the overall operation of the components of the electronic apparatus 100 and commands or data related to the components of the electronic apparatus 100.

The processor 130 may include various processing circuitry and control a plurality of hardware components or software elements of the electronic apparatus 100 using diverse commands or data stored in the memory 140, load and process a command or data received from at least one of the other components, and store diverse data in a non-volatile the memory.

The memory 140 may store the historic utterance information. The historic utterance information may include information on the user voice received through the microphone 110, information on the number of times the user voice was received, or information on the number of times the user voice does not include a trigger word.

The display 150 may display various screens. For example, the display 150 may display a screen including response information corresponding to the user voice.

The display 150 may be implemented as various types of displays, such as, for example, and without limitation, a liquid crystal display (LCD), a plasma display panel (PDP), and the like. The display 150 may include a driving circuit, a backlight unit, and the like which may be implemented in forms such as an a-si TFT, a low temperature poly silicon (LTPS) TFT, an organic TFT (OTFT), and the like. The display 150 may be implemented as a touch screen by combining with a touch sensor.

The inputter 160 may include various input circuitry and receive a user input. The inputter 160 may include, for example, a button and a touch screen, or the like.

The speaker 170 may be configured to output various audio data on which various processing operations such as decoding, amplification, and noise filtering are performed by an audio processor (not illustrated).

According to an embodiment of the disclosure, the speaker 170 may output a sound when a user voice including a wake-up-word is received, thereby providing feedback to the user that the voice recognition function is being performed.

The sensor 180 may output a voltage having a size corresponding to the level of the user voice. Accordingly, the IC chip 120 may identify the level of the user voice based on a sensing value of the sensor 180.

The sensor 180 may sense the movement of the electronic apparatus 100. For example, the sensor 180 may be implemented as an acceleration sensor, a gyro sensor, or a geomagnetic sensor, and detect the movement of the electronic apparatus 100.

The communicator 190 may include various communication circuitry for performing communication with the external apparatus. For example, the communicator 190 may communicate with various external electronic apparatus through a wireless communication method such as, for example, and without limitation, Bluetooth (BT), a Bluetooth low energy (BLE), a wireless fidelity (WI-FI), Zigbee, or the like, or infrared (IR) communication method. The communicator 190 may be mounted on the processor 130 and may be included in the electronic apparatus 100 in a separate configuration from the processor 130.

Figure 9:
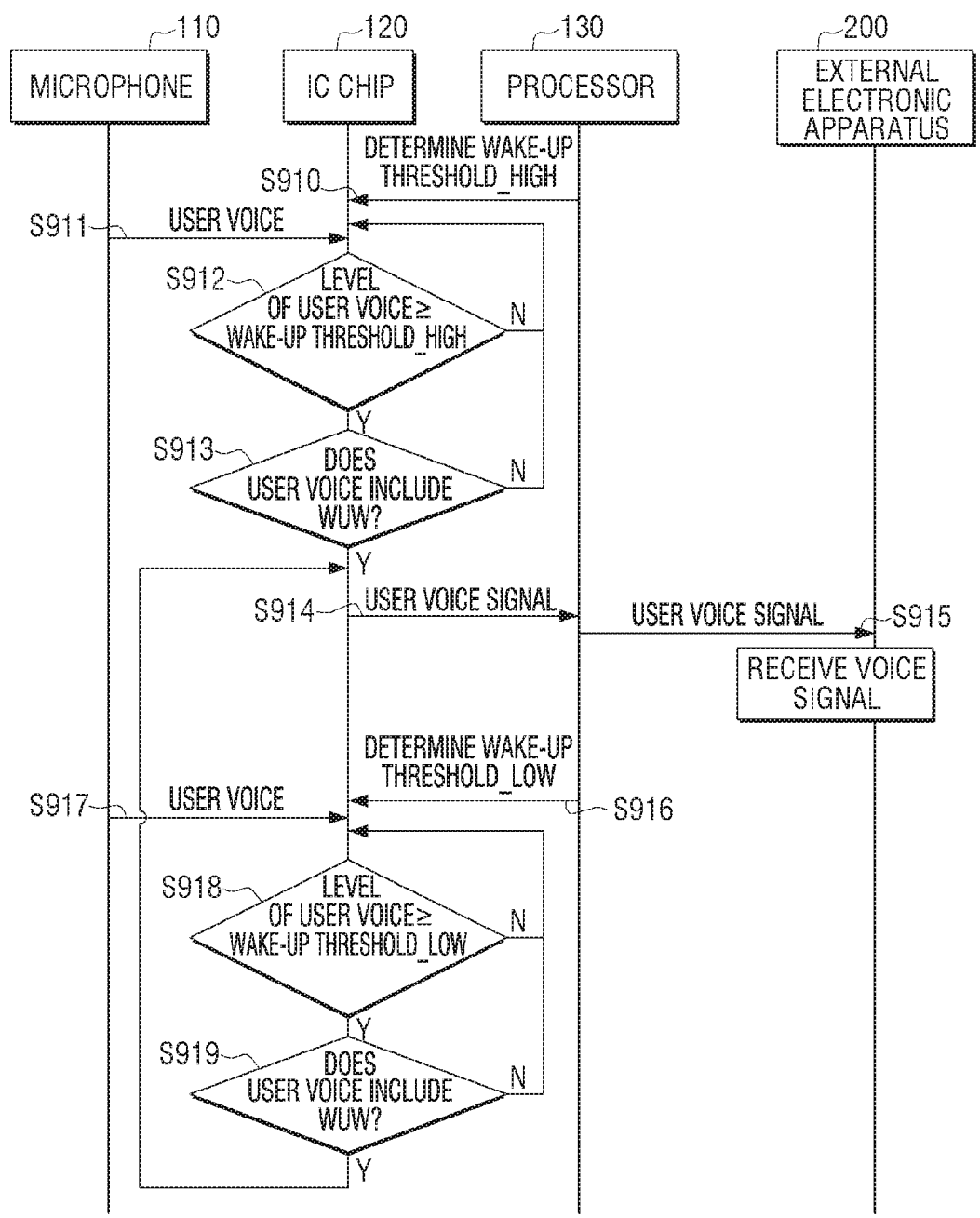
FIG. 9 is an operational flow diagram illustrating an example control method of an electronic apparatus according to an embodiment of the disclosure.

FIG. 9 is an operational flow diagram illustrating an example control method of an electronic apparatus according to an embodiment of the disclosure. Hereinafter, parts overlapping with the above description may not be repeated here.

The processor 130 may determine a threshold value of a wake-up as a first level (S910). The first level may be a relatively high compared to a second level described later.

The IC chip 120 may identify whether the level of the user voice is greater than or equal to the threshold value set as the first level when the user voice is received (S911) while operating in the first state (S912). As an example, the IC chip 120 may measure the level of the user voice may be measured based on the amplitude of the user voice.

The IC chip 120 may maintain the first state when the level of the user voice is less than the threshold value set as the first level, and operate in a second state to identify whether the user voice includes a wake-up-word when the level of the user voice is greater than or equal to the threshold value set as the first level, In the second state, the IC chip 120 may identify whether the wake-up-word is included in the user voice in the second state (S913). For example, the IC chip 120 may apply a speech to text (STT) algorithm to the user voice, convert the user voice to text, and identify whether the text includes the wake-up-word.

For example, if the wake-up-word is 'Hi, Bixby', the IC chip 120 may identify whether 'Hi, Bixby' is included in the text.

When the wake-up-word is identified to be included in the user voice, the IC chip 120 may transmit a signal corresponding to the user voice to the processor 130 (S914) and convert to the first state.

When a signal corresponding to the user voice is received from the IC chip 120, the processor 130 may transmit the signal corresponding to the user voice to the external electronic apparatus 200 (S915). The signal corresponding to the user voice may further include a signal for waking up the external electronic apparatus 200. Accordingly, the external electronic apparatus 200 may initiate a voice recognition function based on the wake-up signal, and perform an operation corresponding to the user voice.

The processor 130 may determine the threshold value set as the first level as a second level lower than the first level (S916).

While being operated in the first state, when the subsequent user voice is received (S917), the IC chip 120 may identify whether the level of the subsequent user voice is greater than or equal to the threshold value set as a second level (S918), maintain the first state if the level of the subsequent user voice is less than the threshold value set as the second level, and operate in the second state for identifying whether the subsequent user voice includes the wake-up-word if the level of the subsequent user voice is greater than or equal to the threshold value set as the second level.

The IC chip 120 may identify whether the wake-up-word is included in the subsequent user voice in the second state (S919), and if the wake-up-word is identified to be included in the subsequent user voice, the IC chip 120 may transmit a signal corresponding to the subsequent user voice to the processor 130.

According to various embodiments of the disclosure as described above, the disclosure includes a configuration of performing a voice recognition when a level of a user voice is a relatively higher than a threshold value, thereby preventing and/or reducing power consumption due to unnecessary voice recognition.

In addition, since the disclosure includes a configuration of performing voice recognition based on a relatively low threshold value after receiving a user voice including a wake-up-word (WUW), thereby increasing a recognition rate of the user voice through a small number of microphones.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

A non-transitory computer readable medium in which a program sequentially performing the controlling method according to the present disclosure is stored may be provided.

The non-transitory computer readable recording medium may refer, for example, to a medium that stores data and that can be read by devices. For example, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been illustrated and described with reference to various example embodiments, it will be understood that the various example embodiments are intended to be illustrative, not limiting. Those skilled in the art will understand and appreciate that various modifications, additions and substitutions are possible, without departing from the true spirit and full scope of the disclosure, including the accompanying claims. Accordingly, such modifications, additions and substitutions should also be understood to fall within the scope of the present disclosure.

What is claimed is:

1. An electronic apparatus comprising:
  a microphone;
  a second processor configured to, based on a level of a user voice input received through the microphone being equal to or greater than a threshold value set as a first level, identify whether the user voice input includes a wake-up-word (WUW); and
  a first processor configured to, based on the WUW being included in the user voice input transmit a signal corresponding to the user voice input to an external electronic apparatus, and based on the transmitting of the signal corresponding to the user voice input being completed, set the threshold value to a second level lower than the first level,
  wherein the second processor is configured to:
    based on the level of the user voice input received in a first state being less than the threshold value set as the first level, maintain the first state, and
    based on the level of the user voice input received in the first state being equal to or greater than the threshold value set as the first level, operate in a second state to identify whether the user voice input includes the WUW, and
  wherein the second processor is further configured to, based on a subsequent user voice input being received through the microphone, identify whether a level of the subsequent user voice input is equal to or greater than the threshold value set as the second level, and based on the level of the subsequent user voice input being equal to or greater than the threshold value set as the second level, identify whether the subsequent user voice input includes the WUW.

2. The electronic apparatus as claimed in claim 1, wherein the second processor configured to, based on operating in the second state, identify whether the user voice input includes the WUW, and based the WUW being identified as being included in the user voice input, generate a wake-up-word signal and transmit the signal to the first processor, and based on the WUW being identified as not being included in the user voice input, convert the state to the first state.

3. The electronic apparatus as claimed in claim 2, wherein the first processor is configured to, based on the WUW signal being received, transmit the WUW signal to the external electronic apparatus, and based on a signal requesting a transmission of a signal corresponding to the user voice input being received from the external electronic apparatus in response to the transmission of the WUW signal, transmit the signal corresponding to the user voice input received from the second processor to the external electronic apparatus.

4. The electronic apparatus as claimed in claim 1, wherein the first processor configured to, based on operating in the first state, based on the subsequent user voice input being received, identify whether the level of the subsequent user voice input is equal to or greater than the threshold value set as the second level, and based on the level of the subsequent user voice input being less than the threshold value set as the second level, maintain the first state, and based on the level of the subsequent user voice input being equal to or greater than the threshold value set as the second level, operate in the second state to identify whether the subsequent user voice input includes the WUW.

5. The electronic apparatus as claimed in claim 4, wherein the second processor is configured to identify whether the subsequent user voice input includes the WUW in the second state, and based on the WUW being identified to be included in the subsequent user voice input, generate the WUW signal and transmit the WUW signal to the first processor, and based on the WUW being identified to be included in the subsequent user voice input, convert the state into the first state.

6. The electronic apparatus as claimed in claim 1, wherein the first processor is configured to, based on the WUW signal not being received from the second processor within a predetermined time after changing the threshold value, reset the threshold value, set as the second level, to the first level.

7. The electronic apparatus as claimed in claim 1, wherein the second processor is configured to, based on the WUW being identified to not be included in the user voice input, identify a number of times that the user voice input which does not include the WUW has been received, and
  wherein the first processor is configured to, based on a signal requesting to change the threshold value set as the first level being received from the second processor, set the threshold value to a third level higher than the first level.

8. The electronic apparatus as claimed in claim 7, wherein the first processor is configured to, based on identifying that the predetermined time has passed since the time at which the threshold value was changed, reset the threshold value, set as the third level, to the first level.

9. A method of controlling an electronic apparatus comprising:
  identifying whether a level of a user voice input received through a microphone is equal to or greater than a threshold value set as a first level;
  identifying whether the user voice input includes a wake-up-word (WUW) based on the level of the c being equal to or greater than the threshold value set as the first level;
  transmitting a signal corresponding to the user voice input to an external electronic apparatus based on the WUW being included in the user voice input; and
  setting the threshold value as a second level lower than a first level based on a transmission of a signal corresponding to the user voice input being completed,
  wherein the identifying whether the level of the user voice input is equal to or greater than the threshold value set as the first level comprises:
    based on the level of the user voice input received in a first state being less than the threshold value set as the first level, maintain the first state, and
    based on the level of the user voice input received in the first state being equal to or greater than the threshold value set as the first level, operate in a second state to identify whether the user voice input includes the WUW, and wherein the method further comprises, based on a subsequent user voice input being received through the microphone, identifying whether a level of the subsequent user voice input is equal to or greater than the threshold value set as the second level; and based on the level of the subsequent user voice input being identified to be equal to or greater than the threshold value set as the second level, identifying whether the subsequent user voice input includes the WUW.

10. The method as claimed in claim 9, wherein the identifying whether the user voice input includes the WUW comprises, based on operating in the second state, identifying whether the user voice input includes the WUW, and based on the WUW being identified to be included in the user voice input, generating a WUW signal and transmitting the signal to the external electronic apparatus, and based on the WUW being identified to not be included in the user voice input, converting the state into the first state.

11. The method as claimed in claim 10, further comprising, based on a signal requesting to transmit a signal corresponding to the user voice input being received from the external electronic apparatus in response to the transmission of the WUW signal, transmitting the signal corresponding to the user voice input to the external electronic apparatus.

12. The method as claimed in claim 9, wherein the identifying whether the level of the subsequent user voice input is equal to or greater than the threshold value set as the second level comprises, based on operating in the first state, based on the subsequent user voice input being received, identifying whether the level of the subsequent user voice input is equal to or greater than the threshold value set as the second level, based on the level of the subsequent user voice input being less than the threshold value set as the second level, maintaining the first state, and based on the level of the subsequent user voice input being equal to or greater than the threshold value set as the second level, operating in the second state to identify whether the subsequent user voice input includes the WUW.

13. The method as claimed in claim 12, wherein the identifying whether the subsequent user voice input includes the WUW comprises:

identifying whether the subsequent user voice input includes the WUW in the second state, and based on the WUW being identified to be included in the subsequent user voice input, generating the WUW signal and transmitting the signal to the external electronic apparatus, and based on the WUW being identified to not be included in the subsequent user voice input, converting the state into the first state.

14. The method as claimed in claim 9, further comprising, based on the WUW signal not being received within a predetermined time after changing the threshold value, reset the threshold value, set as the second level, to the first level.

15. The method as claimed in claim 9, further comprising, based on the WUW being identified to not be included in the user voice input, identifying the number of times the user voice input which does not include the WUW has been received, and based on the number of times being greater than a predetermined number of times, setting the threshold value to a third level higher than the first level.

16. The method as claimed in claim 15, further comprising, based on identifying that the predetermined time has passed since the time at which the threshold value was changed, resetting the threshold value, set as the third level, to the first level.

17. An electronic apparatus comprising:
a microphone;
a second processor configured to, based on a level of a user voice input received through the microphone being equal to or greater than a threshold value set as a first level, identify whether the user voice input includes a wake-up-word (WUW); and
a first processor configured to, based on the WUW being included in the user voice input, perform an operation corresponding to the user voice input and set the threshold value as a second level lower than the first level,
wherein the second processor is configured to:
based on the level of the user voice input received in a first state being less than the threshold value set as the first level, maintain the first state, and
based on the level of the user voice input received in the first state being equal to or greater than the threshold value set as the first level, operate in a second state to identify whether the user voice input includes the WUW, and
wherein the second processor is configured to, based on a subsequent user voice input being received through the microphone, identify whether a level of the subsequent user voice input is equal to or greater than the threshold value set as the second level, and based on the level of the subsequent user voice input being equal to or greater than the threshold value set as the second level, identify whether the subsequent user voice input includes the WUW.

* * * * *